US010003522B2

(12) United States Patent
Ahuja et al.

(10) Patent No.: US 10,003,522 B2
(45) Date of Patent: Jun. 19, 2018

(54) ROUTING WITH FLOW OVER SHARED RISK LINK GROUPS

(71) Applicant: Facebook, Inc., Menlo Park, CA (US)

(72) Inventors: Satyajeet Singh Ahuja, Cupertino, CA (US); Gayathrinath Nagarajan, Sunnyvale, CA (US); Petr V. Lapukhov, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 165 days.

(21) Appl. No.: 14/838,151

(22) Filed: Aug. 27, 2015

(65) Prior Publication Data
US 2017/0063666 A1    Mar. 2, 2017

(51) Int. Cl.
*H04L 12/26*    (2006.01)
*H04L 12/727*    (2013.01)
*H04L 12/709*    (2013.01)

(52) U.S. Cl.
CPC .......... *H04L 45/121* (2013.01); *H04L 45/245* (2013.01); *Y02D 50/30* (2018.01)

(58) Field of Classification Search
CPC .................................................. H04L 45/245
See application file for complete search history.

(56) References Cited

U.S. PATENT DOCUMENTS

| | | | | |
|---|---|---|---|---|
| 6,538,991 B1 * | 3/2003 | Kodialam | ........... | H04L 41/5003 370/229 |
| 6,556,541 B1 * | 4/2003 | Bare | ..................... | H04L 12/185 370/235 |
| 6,584,071 B1 * | 6/2003 | Kodialam | ............... | H04L 45/02 370/238 |
| 7,277,393 B1 * | 10/2007 | Jacobson | .............. | H04L 47/125 370/238 |
| 7,295,510 B2 * | 11/2007 | Johri | ........................ | H04L 1/22 370/216 |
| 8,059,528 B2 * | 11/2011 | Johri | ........................ | H04L 1/22 370/227 |
| 8,103,789 B1 * | 1/2012 | Gan | ..................... | G06F 11/1464 370/242 |
| 8,861,340 B1 * | 10/2014 | Atlas | ...................... | H04L 45/28 370/225 |
| 8,867,333 B2 * | 10/2014 | Doshi | ................. | H04L 41/0896 370/216 |
| 8,958,286 B1 * | 2/2015 | Atlas | ....................... | H04L 12/18 370/225 |
| 9,258,174 B1 * | 2/2016 | Gerstel | ............ | H04L 29/06537 |
| 9,485,135 B1 * | 11/2016 | Sarkar | ................. | H04L 41/0654 |
| 2004/0024906 A1 * | 2/2004 | Valdevit | .................. | H04L 45/12 709/241 |
| 2006/0072543 A1 * | 4/2006 | Lloyd | .................... | H04L 47/70 370/351 |

(Continued)

*Primary Examiner* — Guang W Li
(74) *Attorney, Agent, or Firm* — FisherBroyles, LLP

(57) ABSTRACT

A network topology is analyzed to identify shared risk link groups, the edge diversities of paths, and maximally diverse edges for paths. During operation of the network for conveying data packets between two end points, data flows are routed in the network by prioritizing the use of resources that do not belong to a shared risk group and are maximally diverse with other edges already being used. Various load balancing techniques can be used to minimize the risk of serious disruption in the event an underlying resource of a shared risk link group goes down.

20 Claims, 17 Drawing Sheets

(56) References Cited

U.S. PATENT DOCUMENTS

| | | | | |
|---|---|---|---|---|
| 2007/0286097 A1* | 12/2007 | Davies | H04L 45/02 | 370/255 |
| 2008/0123532 A1* | 5/2008 | Ward | H04L 45/125 | 370/238 |
| 2008/0123533 A1* | 5/2008 | Vasseur | H04L 45/00 | 370/238 |
| 2008/0219268 A1* | 9/2008 | Dennison | H04L 12/4625 | 370/395.2 |
| 2009/0073994 A1* | 3/2009 | Qureshi | H04L 29/12792 | 370/401 |
| 2012/0069740 A1* | 3/2012 | Lu | H04L 45/04 | 370/238 |
| 2012/0155268 A1* | 6/2012 | Ohshio | H04L 47/12 | 370/235 |
| 2013/0286846 A1* | 10/2013 | Atlas | H04L 45/34 | 370/236 |
| 2014/0126899 A1* | 5/2014 | Prakash | H04B 10/032 | 398/5 |

\* cited by examiner

| Path | A1 | A2 | A3 | A4 | A5 | A6 | A7 |
|---|---|---|---|---|---|---|---|
| S-11-1-13-T | x | | | x | | x | |
| S-11-2-13-T | x | | | x | | x | |
| S-11-3-13-T | x | | | x | | x | |
| S-11-4-13-T | x | | | x | | x | |
| S-11-5-13-T | | x | | x | | x | |
| S-11-6-13-T | | x | | x | | x | |
| S-12-7-14-T | | | x | | x | | x |
| S-12-8-14-T | | | x | | x | | x |
| S-12-9-14-T | | | x | | x | | x |
| S-12-10-14-T | | | x | | x | | x |

*FIG. 3B*

| Path | Path Weight (before) | Path Weight (After) | Util (after) |
|---|---|---|---|
| S-11-1-13-T | 4 | 4 | 1 |
| S-11-2-13-T | 4 | 4 | 0 |
| S-11-3-13-T | 4 | 4 | 0 |
| S-11-4-13-T | 4 | 4 | 0 |
| S-11-5-13-T | 2 | 2 | 0 |
| S-11-6-13-T | 2 | 2 | 0 |
| S-12-7-14-T | 0 | 4 | 1 |
| S-12-8-14-T | 0 | 4 | 0 |
| S-12-9-14-T | 0 | 4 | 0 |
| S-12-10-14-T | 0 | 4 | 0 |

FIG. 5B

| Path | Util (after) |
|---|---|
| S-11-1-13-T | 63 |
| S-11-2-13-T | 63 |
| S-11-3-13-T | 62 |
| S-11-4-13-T | 62 |
| S-11-5-13-T | 125 |
| S-11-6-13-T | 125 |
| S-12-7-14-T | 31 |
| S-12-8-14-T | 31 |
| S-12-9-14-T | 31 |
| S-12-10-14-T | 32 |

850

ROUTING WITH FLOW OVER SHARED RISK LINK GROUPS

TECHNICAL FIELD

This patent application generally relates to digital communication of data and in particular relates to routing of data packets in a digital communication network.

BACKGROUND

In a digital communication network that includes multiple communication nodes, data from a source node to a destination node can typically be routed along many, or even multiple, different possible paths. Path assignment is typically performed to meet a performance criterion such as end-to-end latency experienced by data packets. Simplistic path assignments, however, tend to overlook underlying failure scenarios that may cause disruption in multiple flows due to failure of a single component or path in the communication network. Path failures may occur, e.g., due to failure in a common shared resource such as a common optical fiber over which communication is carrier, or a common equipment, such as a power source or a modulator, that is used to transmit data for multiple flows.

BRIEF DESCRIPTION OF THE DRAWINGS

FIG. 3B is an illustration of an example state of a path weight table after flow assignment.

FIG. 5B is an illustration of an example state of a path weight table after flow assignment.

DETAILED DESCRIPTION

Embodiments are described for assigning paths to data flows in a digital communication network. In some disclosed embodiments, a topology of a network comprising multiple pairs of source node and destination node is analyzed to identify paths that share a common resource. From among the various paths from a source node to a destination node, paths that have the least amount of overlap are identified. During operation of the network, data flows are routed in the network by prioritizing the use of resources such that resources, or transmission paths, that are least sharing a transmission resource with other ongoing flows in the network, are favored, or weighted higher, for allocation to the flow. Various load balancing techniques can be used to minimize the risk of serious disruption in the event an underlying resource of a shared risk link group, which represents all paths sharing a common resource, goes down (e.g., a fiber connection).

Data communication networks, such as the internet or the World Wide Web, have a global reach and facilitate interaction among globally located users via communication through their user devices. To facilitate real time communication, e.g., voice or video conferencing, and to make the network look responsive; low latency, low packet error rates, etc., are generally recognized to be desirable features of such communication networks.

Social media service providers, such as Facebook, provide user connectivity by enabling communication via user applications (apps). Social media service providers often operate servers distributed across a wide region, e.g., a country or continent, that efficiently routes packets. To enable such operation, social media service providers sometimes use the service of a network operator, such as a content delivery network or a telecommunications network, etc.

The communication between two end users, e.g., using a data flow, is often digitized and assembled into data packets. The data packets are transferred from the sender to the receiver via a communication network that includes several communication nodes and paths. All data packets belonging to a data flow need not travel over an identical path, and typically include header data that allows the receiver to receive data packets out-of-order and assemble them back into the correct order. Several network protocols and standards exist for routing of data packets over data communication networks. Multiprotocol label switching (MPLS) is one such communication protocol for efficiently carrying data packets over communication networks. Routing in MPLS networks is achieved by using short paths based on packet labels, and long routing table look ups are typically avoided during packet routing.

Figure 1:
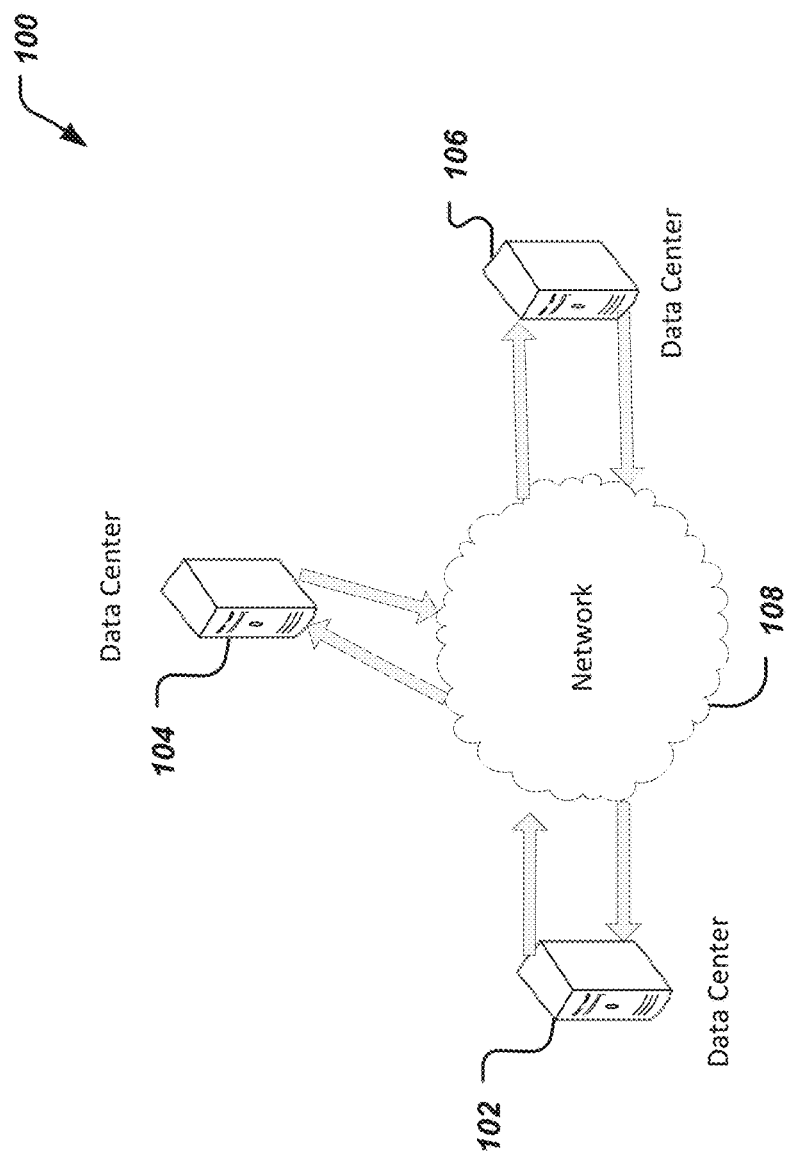
FIG. 1 is a block diagram illustrating an example communication network.

FIG. 1 illustrates an example communication network 100 in which multiple data centers 102, 104, 106 may be communicatively connected with each other through a network 108. The network 108 in general may include several communication nodes, routers, switches, repeaters that are communicating via physical communication channels such as copper wire, optical fiber, coaxial cable, and so on. In large scale deployments, it may be possible to send data packets from a source, e.g., data center 102, to a receiver, e.g., data center 106 using many different communication paths. For example, some data packets of a data flow from Los Angeles to New York may be routed via a switching center in Dallas, while others may be routed via a switching center in Chicago. Further, data packets traveling between the same nodes may use different transmission resources, e.g., different modulators, different signal frequencies, different communication mediums, and so on.

Existing communication networks often attempt to route data packets from the source to the receiver to minimize criteria such as latency and delay. In doing so, it may be possible that all, or substantially all, data flows from a source node to a receiver or a destination node may be using a same transmission resource at some location during transmission through the network 108. Such a data path assignment may leave the data vulnerable to a common resource failure that results in disruption in data flows which may be undesirable due to certain quality of service requirements and service level agreements and also may be hard to recover in case of simultaneous failure in data communication for multiple data flows.

The techniques presented in this document, in one advantageous aspect, allow a system operator to minimize packet loss in various network failure conditions.

In the description provided herein, section headings are used only to improve readability of the description and do not limit scope of the description to the heading below which the description is provided. Furthermore, while certain embodiments have been described using the example of MPLS communication protocol, the technology is not limited to use in an MPLS based communication network and one of ordinary skill in the art will appreciate applicability of the description to any packet based communication network.

MPLS Routing Examples

In some current MPLS networks, packets are routed based on labels or data headers associated with the packets. MPLS routers support configuration of multiple label-switched paths (LSPs) between two label edge routers (LERs) to provide capability to load balance traffic across network. These LSPs are not path constrained and paths don't take shared failures in the network in to account.

One of the problems that arises during the operation of current MPLS networks is that LSPs can share same shared risk link group (SRLG). An SRLG may be a set of links sharing a common resource, which affects all links in the set if the common resource fails. Under failure, a non-deterministic set of LSPs are affected resulting in a non-deterministic volume of traffic being affected. This non-determinism causes non-deterministic network convergence after failure and is hard to plan.

Examples of SRLGs

Links, representing a communication path or conduit from a source node to a destination node, may use several communication resources such as physical resources, e.g., frequency or wavelength, spectrum, polarization domain, optical mode, etc., or a common equipment, e.g., the same modulator, or the same power amplifier, etc. These links share the same risk of failure and are therefore considered to belong to the same SRLG. For example, links sharing a common fiber are said to be in the same SRLG because a fault with the fiber might cause all links in the group to fail. Similarly, all links that use a same polarization plane may fail together if the corresponding polarization domain multiplexer fails.

The shared risk may share resources at different layers of the protocol stack. For example, in some embodiments, the shared resources may be at the physical layer, e.g., wavelength of the light used for data modulation, or the physical fiber shared by two different data flows. Balancing traffic between different shared risk groups enables minimizing disruption to multiple flows in case there is a failure in one of the flows due to a communication glitch in one of the links.

Another example of a shared risk link group may be all logical paths that emanate from or terminate into a same line card that has multiple transceivers. A failure of the card would therefore result in failure in all these paths.

In general, communication nodes themselves may not be a part of a shared risk group, but nodes may communicate with each other using shared resources.

Figure 2A:
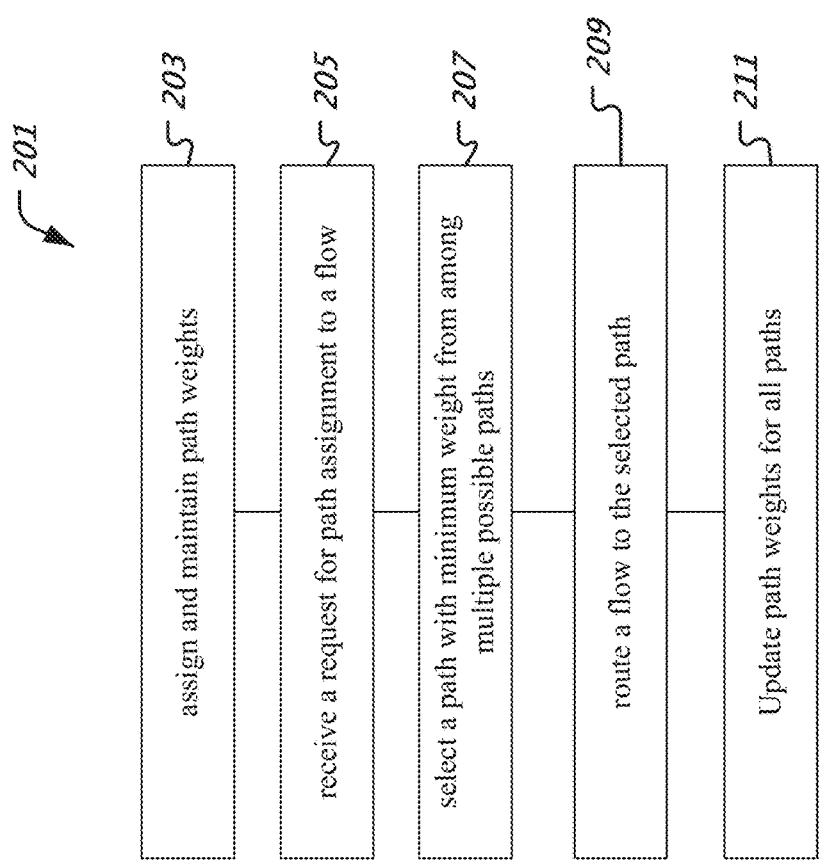
FIG. 2A is a block diagram illustrating an example network of nodes over which communication flows are routed.

FIG. 2A illustrates an example of a data communication network 200 in which routing may be performed without consideration to shared risk groups, causing multiple failures due to shared link failure. In the illustrated example, three paths 206, 208 and 210 are available for data communication between a sender node 202 and a receiver node 204. The path 206 may have the least latency because other paths have an additional hop, Node X for path 208 and node Y for path 210. In deployments that attempt to minimize data latency, initially, all flows from the sender node 202 to the receiver node 204 will be assigned to the path 206. While this assignment provides least latency for data communication, all flows are disrupted due to a failure in link 206. In other words, because the flows all use a shared risk link, from the perspective of resource failure recovery, the assignment of all data flows to path 206 may not be the best choice.

In one example scenario, 96 Mbps throughput may be available on link 206. When a first flow request for a 24 Mbps flow is received at the sender node 202, since the link 206 has minimum hops (e.g., minimum end to end latency) and is able to sustain the entire flow bandwidth, the first flow may be assigned to traverse across the link 206. Similarly, a second flow request and a third flow request for 24 Mbps may both be assigned link 206 because the link stills has bandwidth to accommodate the newly requested stream. Upon such assignment, while all three streams will be using the lowest latency path 206, a failure in the link 206 will cause all the flows to be disrupted. Further, system resources (links 208 and 210) remain unused, and the resource assignment is thus imbalanced.

Edge Diverse Paths

Many data networks include several tens or hundreds of nodes, with corresponding hundreds of paths possible for data communication between two nodes. Each path, or edge, which represents a collection of transmission resources, may be known and relatively static based on the physical network topology. In these communication networks, edge diversity may be a measure of resource independence of paths from each other. Diversity between two paths may indicate whether two paths share any resources in common. For example, edge diversity may indicate probability that failure in one path will result in failure in the other path. In a network, when two paths do not share any resource in common, these paths may be called edge diverse or completely edge diverse. One possible implication of being edge diverse is that because no resources are shared, a transmission failure in one path may not necessarily result in a transmission failure in the other path. If a logical network topology is such that no two paths can be completely edge diverse, then two paths are called maximally edge diverse if the paths are as diverse as is permitted by the logical topology of the network. Put differently, the maximally edge diverse paths will be minimally overlapping, to the extent permitted by the logical topology of a given network.

In general, in a network, multiple maximally edge diverse paths, or paths having a same level of edge diversity, may exist from one node to the other. However, paths that have the same edge diversity may still differ from each other in terms of other operational parameters such as available bandwidth, latency, cost of operation, and so on.

Identifying SRLGs in a Network

In data communication networks, physical topology of a network service provider's network is generally known to the network service provider. The planning system may thus analyze the topology to identify, and isolate paths or edges that will have the same impact on communication.

From a known topography of the network, SRLG computation may be performed offline. Alternatively or in addition, SRLG computation may be performed during network operation, based on control messages received about data transmission success/failure and network configuration changes. The loading of each path, e.g., may be updated from time to time during the operation on the network, whereas the actual layout of the physical communication medium may remain relatively static over long time periods (e.g., for several months). Subsets of topology can them be divided and load balanced. At a given time, when path assignment is to be performed, a path with minimum weight may be figured out.

For example, in some embodiments, two data centers in two different cities may be connected to each other via a fiber optic link. The fiber optic link itself may carry several Gbps of data traffic for many different type of applications. The traffic may be carried on different optical wavelengths and may be polarization domain multiplexed. In such a case, three applications A1, A2 and A3 may be communicating data over the same fiber. The traffic for A1 and A2 may be on the same wavelength but different polarizations and the traffic of A3 may be on a different wavelength than that of A1 and A2. In this example, application A1 and A2 the fiber is SRLG for all three applications A1, A2 and A3, but only A1 and A2 share the "wavelength" SRLG. Further, there may be many failures that cause a given subset to fail, and it may not be necessary to separately model each failure.

Allocation of Flows to Paths

In a data communication network in which shared risk groups have been identified, data packets of a flow may be assigned to different paths based on operational criteria that meet not just latency constraints but also may attempt to increase edge diversity of assignment of packets to paths.

In general, bandwidth assignment may be assigned based on type of application that is generating, or will be consuming, the data packets. For example, multimedia packets (audio, video) may be assigned bandwidth at a higher priority than data from applications that may be more tolerant to longer latency. The flow, or traffic, between two nodes may be all or some of the data communication for a given application or a given user. Many applications generate (and consume) packets that have the same sender or receiver device ID (e.g., IP address or MAC address) and port ID. A node may split data generated at an application layer into multiple flows, e.g., two flows, each carrying 50% of the packets.

Another consideration during the assignment of a path to data may be based on use fairness, e.g., percent use of a given path. This consideration may attempt to keep all paths equally busy to fairly spread the bandwidth of flows across all paths.

Figure 2B:
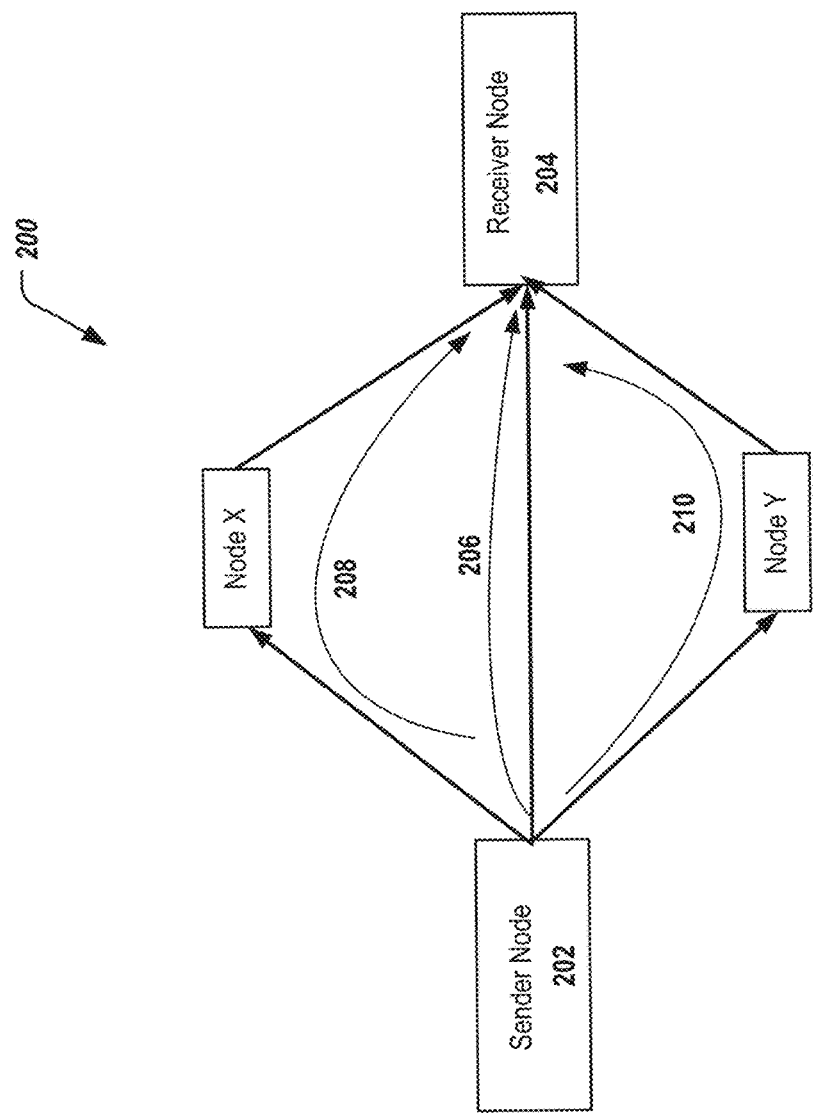
FIG. 2B is a flow chart illustrating an example method for assigning paths to flows in a digital communication network.

In some embodiments, to meet traffic demand between a source node and a receiver node, a path assignment module may identify a list of maximally edge diverse routes that satisfy another operational or quality of service constraint such as delay constraint. For each possible path, the path assignment module may identify its SRLG set, and load balance flow across paths in the list using the following procedure, e.g., as illustrated in the flow chart example for a method 201 in FIG. 2B. The method 201 may be performed by a processor at a source node or a control node that controls assignment of paths to flows in the network or a path assignment module which may be implemented in hardware, software or a combination thereof.

At 203, the method 201 may include assigning and maintaining weights for paths. Weight of each path is sum of flow carried by SRLGs affecting the path. At the onset of the operation of the network, the assignment of path weight sets weight of each path is set to zero.

At 205, the method 201 may include receiving a request for assigning a path to a flow. The request may be made by a source node, e.g., a user device, to transfer data from the source node to another node in the network.

The method 201 may repeat the following steps until a flow is assigned to the request.

At 207, the method 201 includes selecting a path with minimum weight. In other words, select a path that is maximally non-overlapping with other possible paths being used for other flows. During this selection, break ties based on, in some order, minimum path delay, current percent utilization, and in case of a tie random selection.

At 209, the method 201 includes routing a flow f on the selected path. For example, routing may include communicating information to other resources in the network, e.g., routers, modulators, switches, repeaters, etc. of the path assigned to carriage of a particular flow.

At 211, the method 201 may include updating weight of each path in the network as the total flow carried over SRLGs affecting this path.

The path assignment module may be implemented at the source node or may be implemented at a controller node elsewhere in the network and the path selection may be conveyed to the source node. In various embodiments, choice of which packets from application layer constitute a flow f is dictated by how granular flow spray is intended, which may be an operator-specified parameter for the operation of the network.

Examples of Path Assignments

With reference to FIGS. 3A, 3B, 4A, 4B, 5A, 5B, 6A, 6B, 7A, 7B, 8A and 8B, an example of how paths can be assigned to flows in the network is described. In the described example, new flows are allocated paths in a network using path weights, and once a flow assignment is made, path weights are updated to reflect the assignment, so that future flow assignments take into account path availability based on the updated path weights.

Figure 3A:
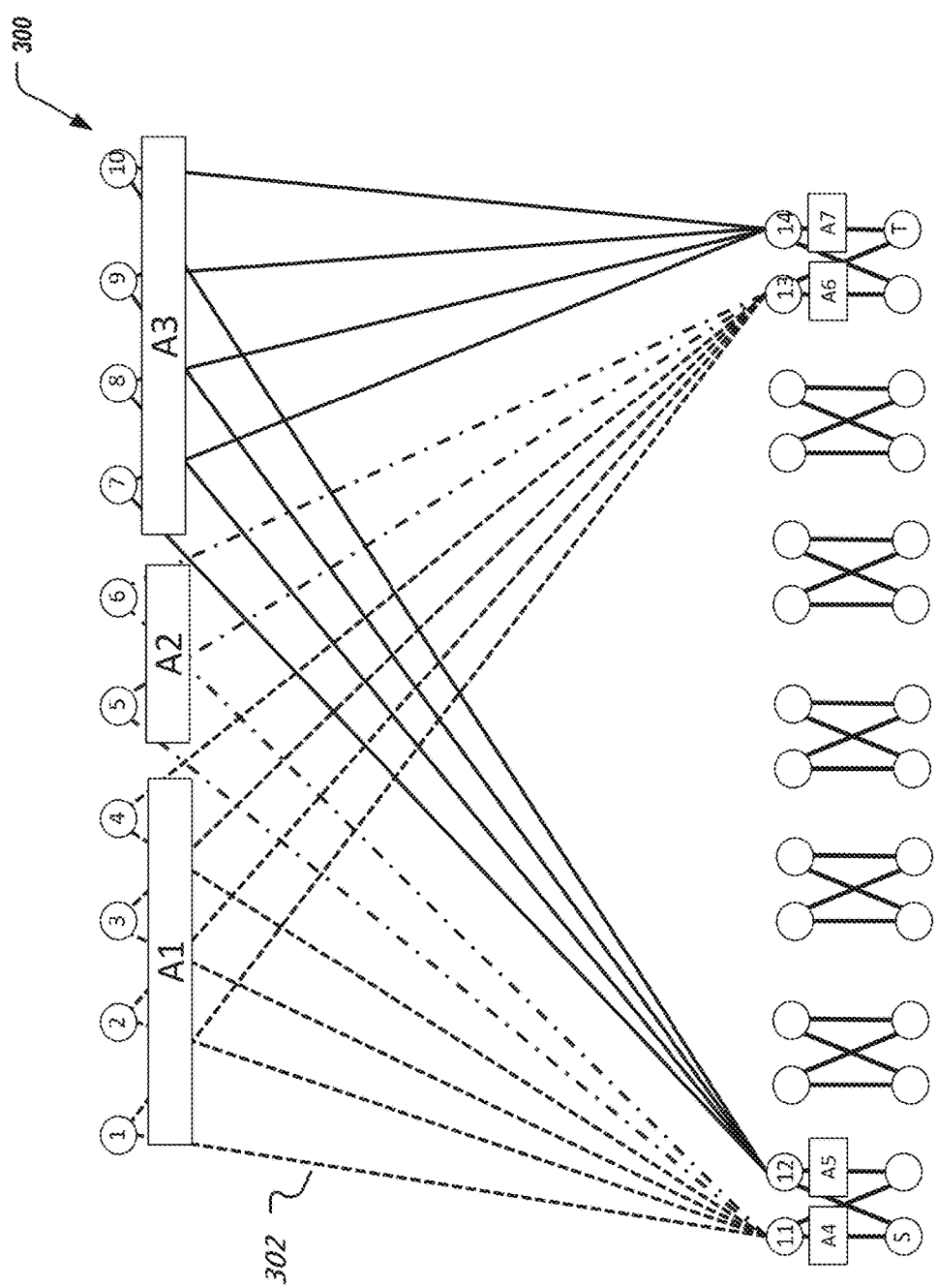
FIG. 3A is a block diagram illustrating an example path assignment to a flow in a network that includes shared risk link groups.

FIG. 3A illustrates an example path assignment to a flow in a network 300 that includes shared risk link groups. The tree graph 300 shows an initial state of the network, without any flows actually being carried in the network.

In the example tree graph 300, data is to be transferred between a sending node S and a receiving node T. Various paths, indicated by the bold and dashed lines, may be available for flow assignment from the sending node S to the receiving node T. When paths share a resource group, the paths are shown to overlap graphically using bounding boxes A1 to A7. The resources 1, 2, 3, and 4 form an SRLG A1, the resources 5 and 6 form SRLG A2 and resources 7, 8, 9, 10 form SRLG A3. Similarly, SRLG A4, A5, A6 and A7 are also depicted in graph 300.

As depicted, path 302 depicts one possible path from among many possible paths from S to T. The path 302 may uses the following edges: from S to 11, 11 to 1, 1 to 13 and 13 to T. Many other paths are possible (e.g., S to 11 to 2, 2 to 13 and 13 to T) and are listed in Table 350. In general, each path may have a different latency associated with it. In general, each path, or edges of the path, may have a different percent utilization associated with it. However, since FIG. 3A represents the state of network when no paths are present, for the moment, the percent occupancy of each possible path from S to T will be zero.

FIG. 3B illustrates an example Table 350 path weight matrix that shows the baseline network topology. The rows in Table 350 represents various paths, which are sequences of edges, possible for flows from S to T. Corresponding to each row, columns represent all SRLGs in the network, and an indication of which SRLGs are being used by the corresponding path is given by a corresponding "x" in a cell. In the network 300, as can be seen from Table 350, ten different paths are possible from S to T and seven different SRLGs are used in the network. Of the seven SRLGs, some SRLGs are used more by the paths than others. For example, SRLGs A4 and A6 are used by six paths each, while SRLG A2 is only used by two paths.

Since many paths are available (ten paths from S to T, in this example), which may have the same latency and percent utilization, the first path assignment may be based on a pre-determined scheme such as a random path assignment, and the path 302 may be accordingly allocated to the first flow established in the network. The first path allocation may be performed based on a tie-breaker, and may allocate the path S to 11 to 1 to 13 to T to the first flow (302).

Figure 4A:
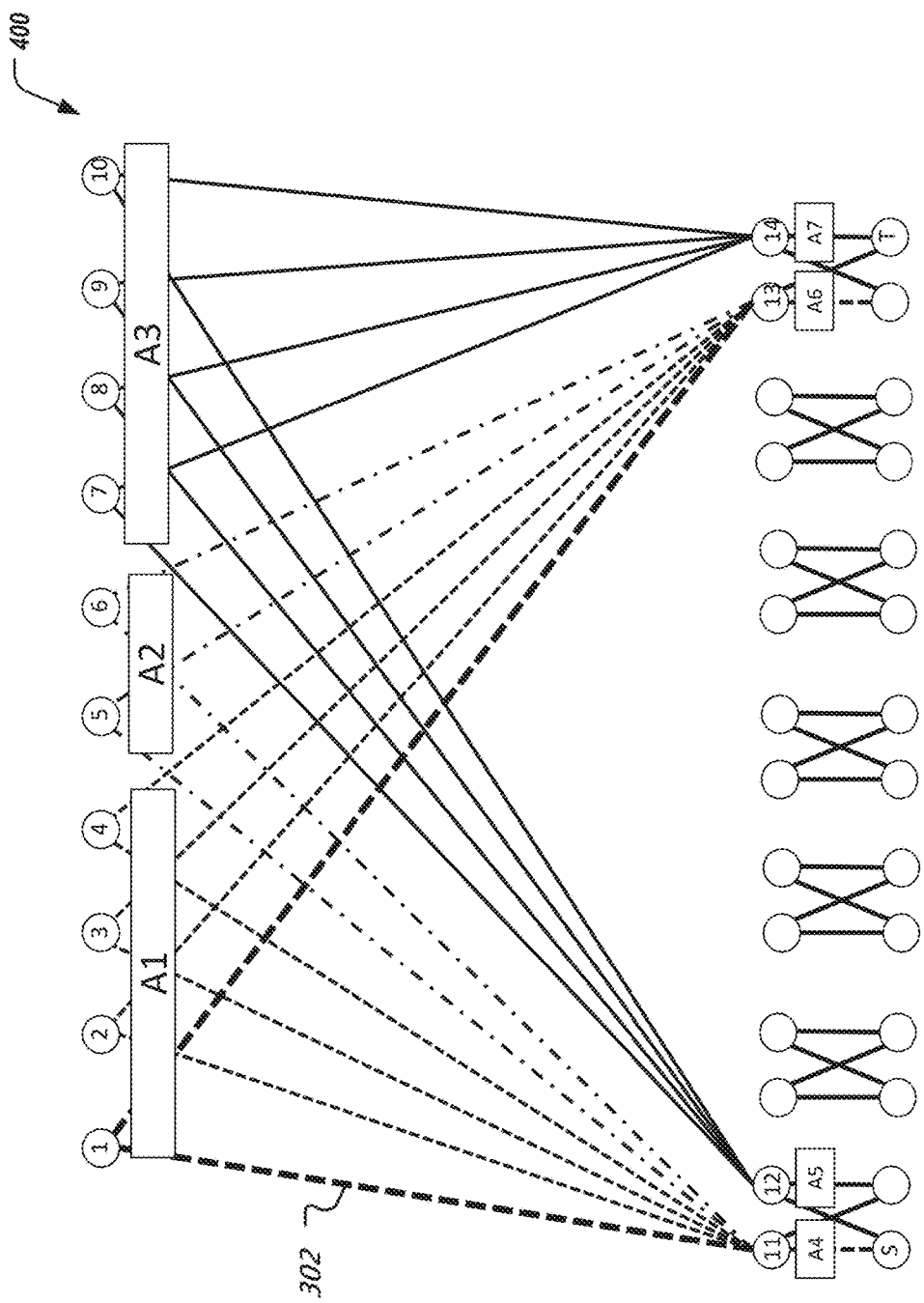
FIG. 4A is a block diagram illustrating an example path assignment to a flow in a network that includes shared risk link groups.

FIG. 4A depicts this illustrative path assignment 400 which shows that path 302 is assigned to the first flow.

Figure 4B:
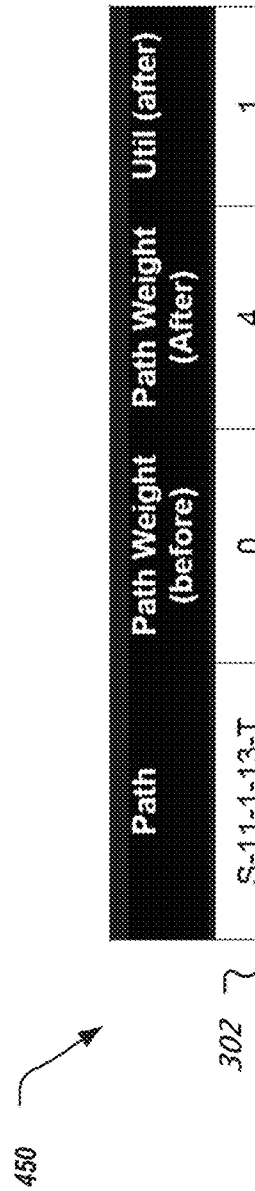
FIG. 4B is an illustration of an example state of a path weight table after flow assignment.

FIG. 4B illustrates an example state of the path weight table 450 after flow assignment in the previous iteration (flow 302). Similar to the Table 350, the first column lists all possible paths from S to T. The second column "path weight (before)" lists a metric of path utilization prior to flow assignment. Since the network did not have any flows before the path assignment in the previous iteration (path 302), all entries in this column are set to zero.

The third column "path weight (after)" lists a metric of path utilization after flow assignment to path 302 is completed, as described with respect to FIG. 3A and FIG. 3B. For example, the entry "4" in the second row "S to 11 to 2 to 13 to T" indicates that this path shares an SRLG (in this case A1) with the selected path, which would cause failure in 4 nodes (e.g., 1, 2, 3 and 4). Similarly, the row "S to 11 to 5 to 13 to T" has a path weight of "2" because SRLG A2, has a two-node overlap with the selected path.

The last column indicates whether a given path is currently allocated and in use in the network. A "1" may indicate that the path has been previously allocated to another flow. A "0" may mean that the path is not assigned to any flow. In general, the last column may be used to indicate a percent utilization of the path for ongoing flows in the network.

Figure 5A:
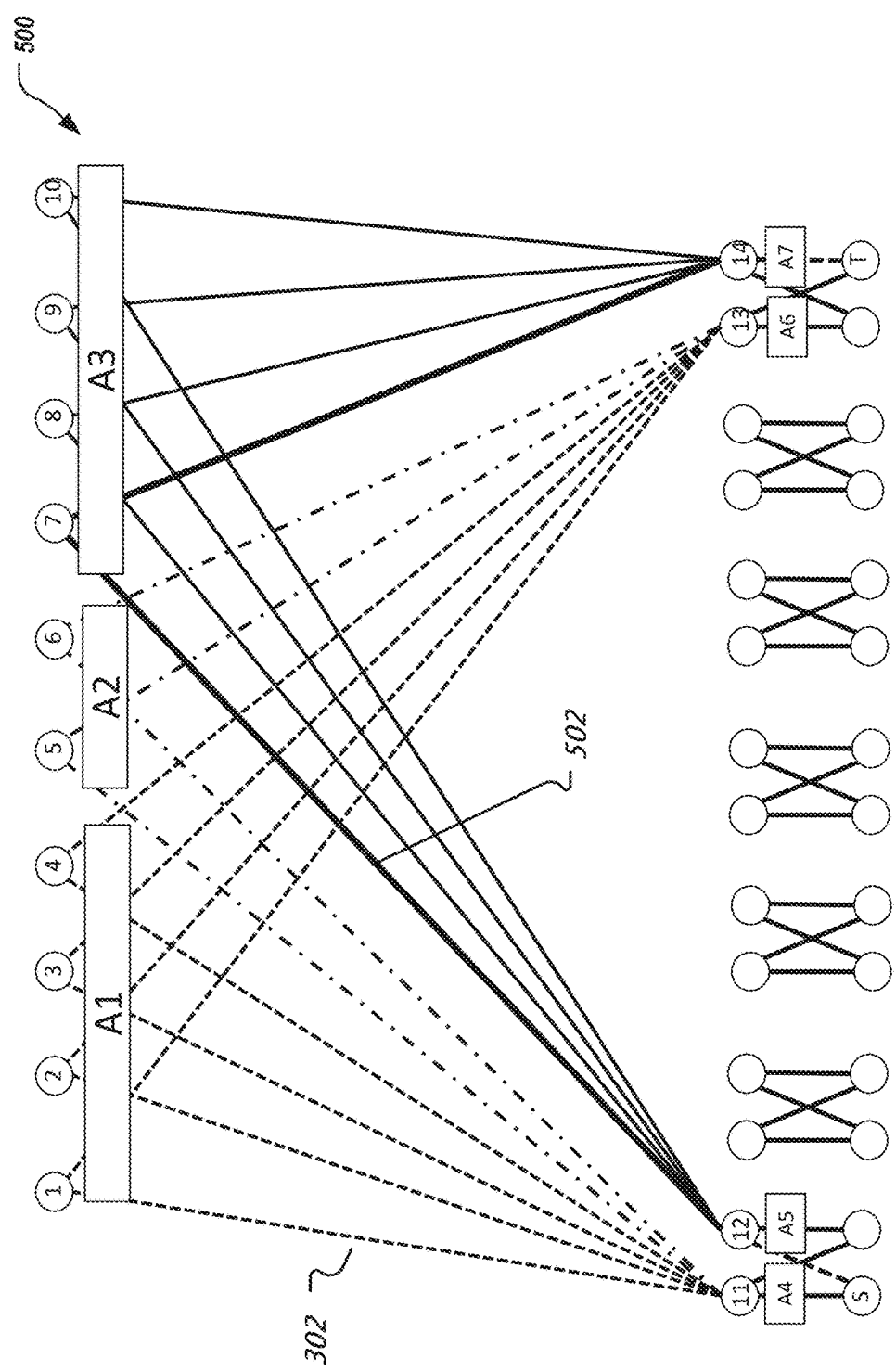
FIG. 5A is a block diagram illustrating an example path assignment to a flow in a network that includes shared risk link groups.

FIG. 5A illustrates the state of the network 500 after a next path assignment is made to a next flow. The network 500 includes a second flow, assigned a path 502, that carries data from S to T. Looking back at Table 450, after the flow assignment in the previous iteration, it can be seen that the last four entries of the Table 450 listed paths that had zero weights, representing the least used paths among all available paths in the network. The flow 502 is assigned path S to 11 to 5 to 13 to T, which is one of the four least used paths based on the minimum path weight selection, and may be selected from among the four possible paths using a tie-breaker followed by random selection between two paths of equal weights.

FIG. 5B illustrates an example state of a path weight Table 550 before and after flow assignment for the flow 502. As can be seen from Table 550, entries for path 302 and 502 are marked as being used. Further, the weights are updated to reflect the increased utilization of SRLGs due to allocation of flow to path 502.

Figure 6A:
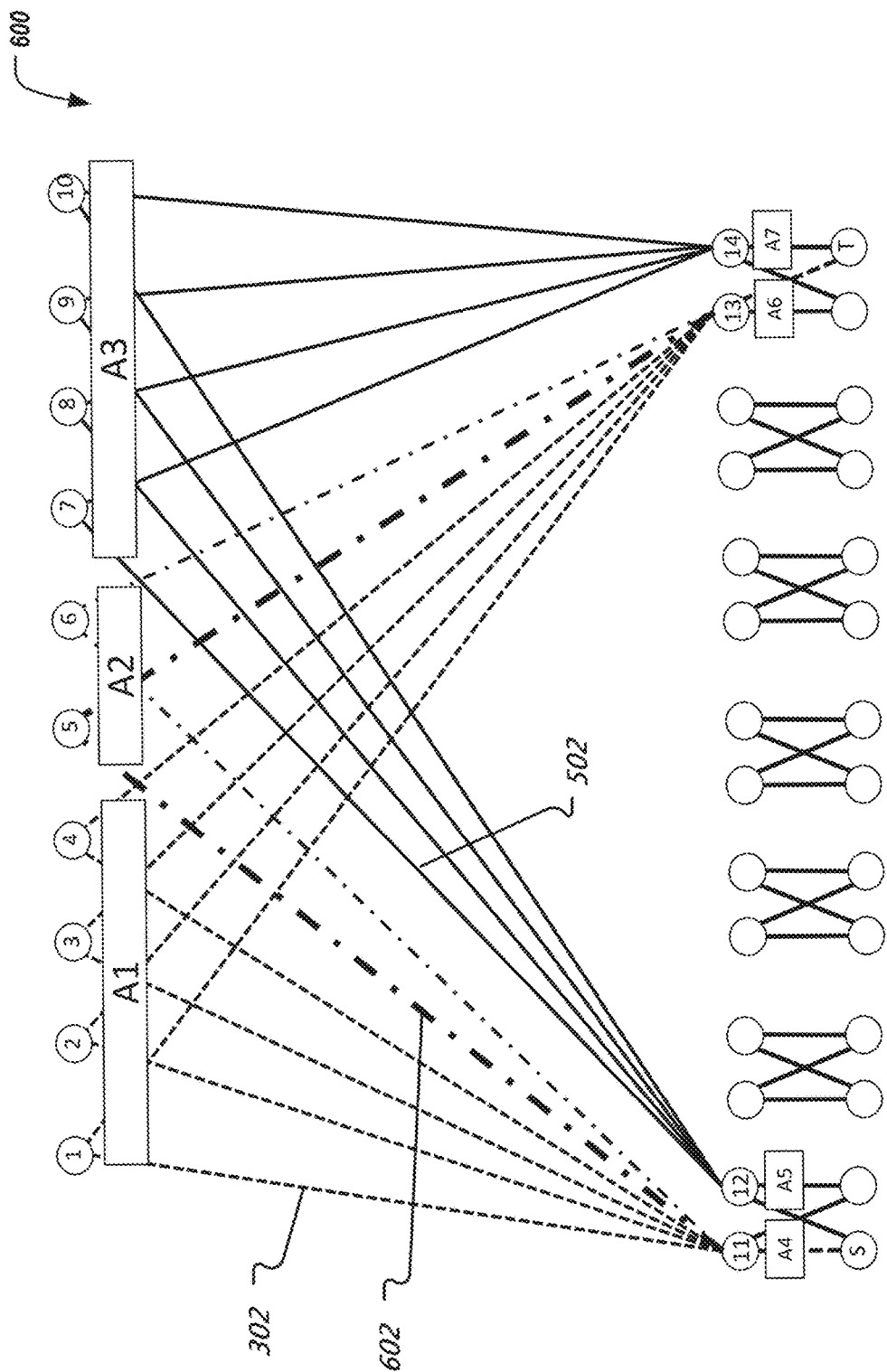
FIG. 6A is a block diagram illustrating an example path assignment to a flow in a network that includes shared risk link groups.

FIG. 6A illustrates the state of the network 600, after a next flow is assigned path 602 in the network.

Figure 6B:
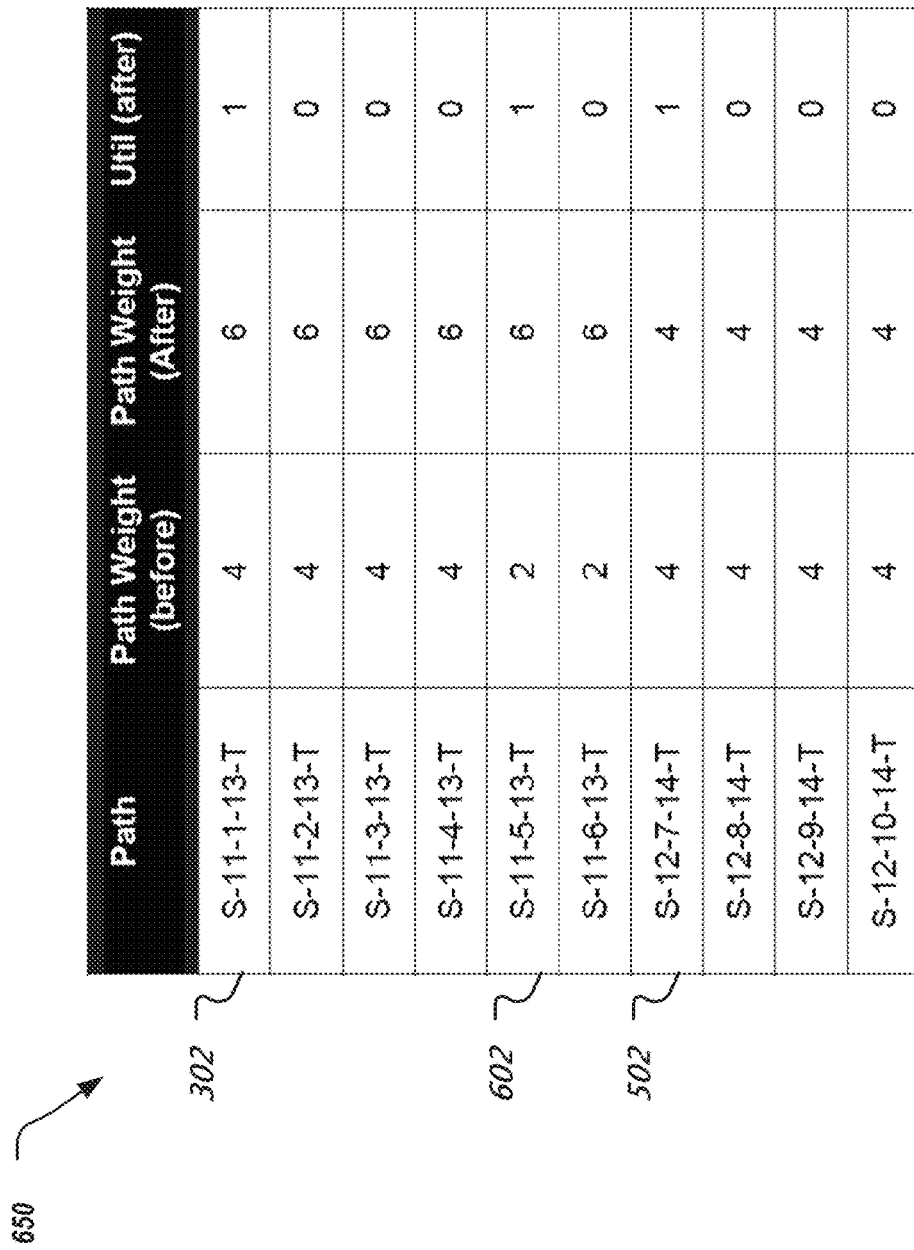
FIG. 6B is an illustration of an example state of a path weight table after flow assignment.

FIG. 6B illustrates an example state of a path weight table 650 before and after flow assignment. Prior to the assignment of a path to the next flow, as can be seen by Table 550, two possible paths between S and T had the least weight (2, in this case). For the next flow, one of these two paths can be selected using a tie breaker. In the illustrated example, the flow 602 is assigned path S to 12 to 8 to 14 to T, based on minimum weight selection and breaking the tie using a random selection. Table 650 accordingly reflects the increased utilization of path weights for path 302 to "6" because path 602 uses A6, which it shares with path 302.

Figure 7A:
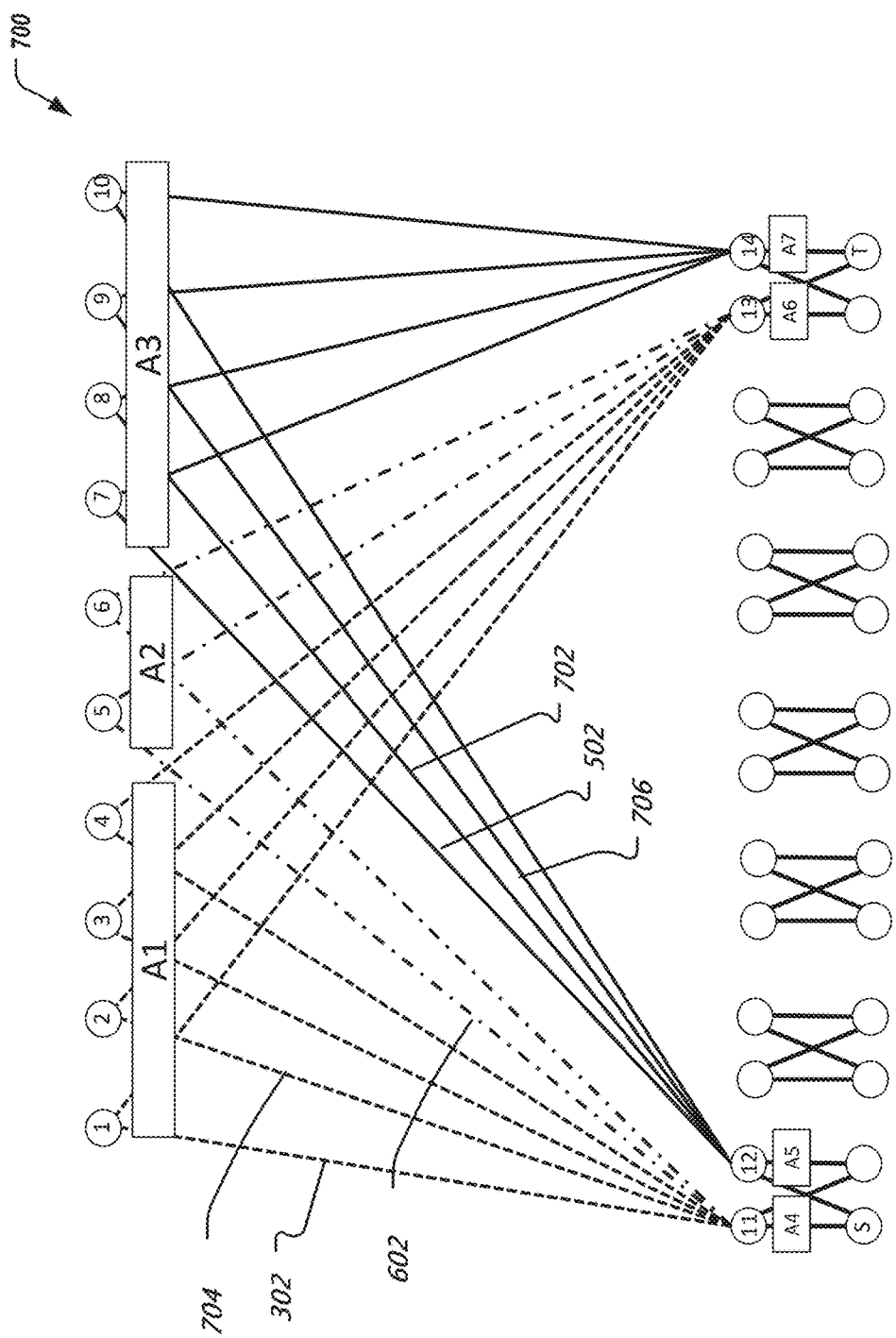
FIG. 7A is a block diagram illustrating an example path assignment to a flow in a network that includes shared risk link groups.

FIG. 7A illustrates a snapshot of the state of the network 700 after three additional path assignments, 702, 704 and 706 have been made in the network.

Figure 7B:
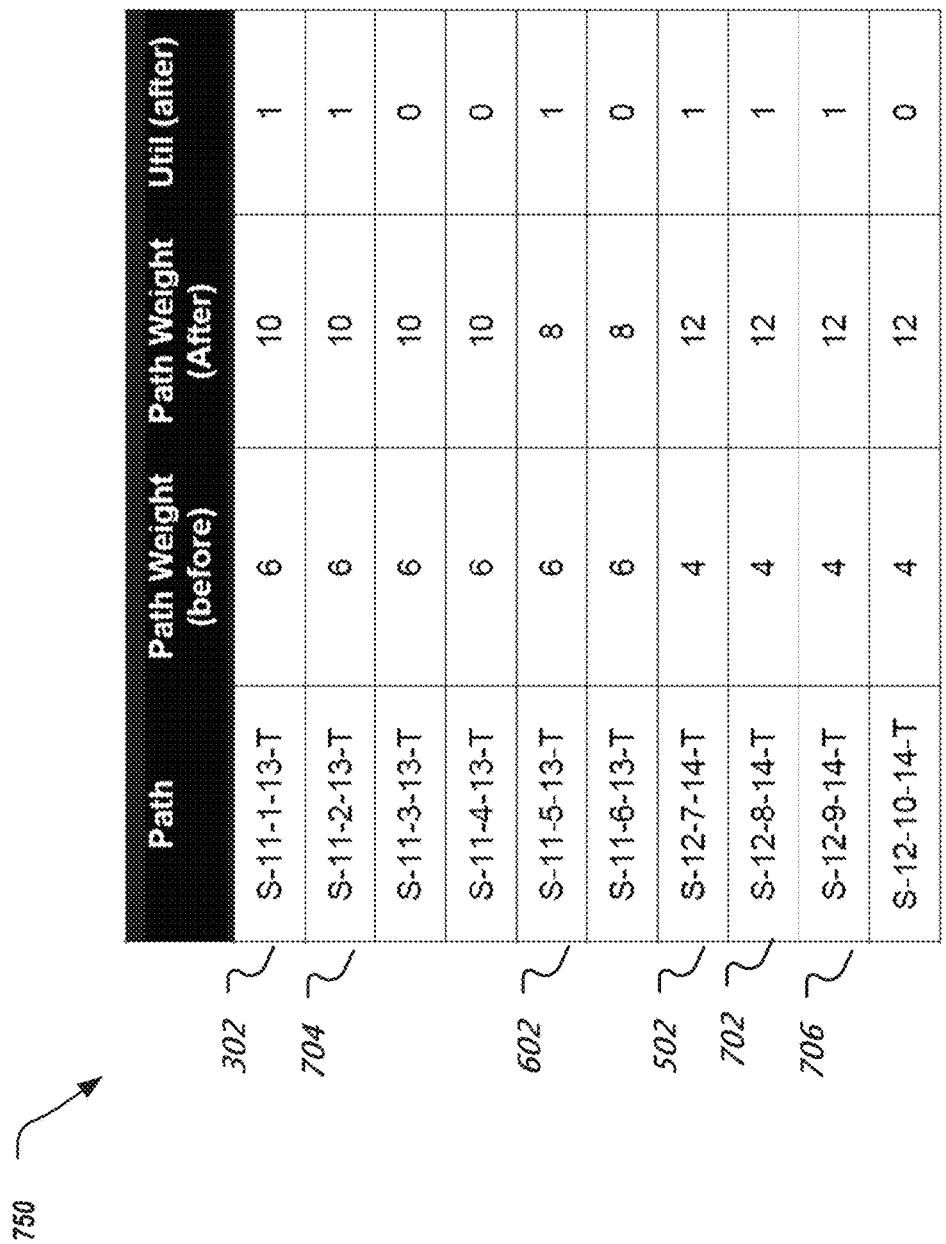
FIG. 7B is an illustration of an example state of a path weight table after flow assignment.

FIG. 7B illustrates the corresponding Table 750 after the three flows 702, 704 and 706 are assigned one after another (in that sequence) and the corresponding changes to the weights of each path being used. As can be seen from Table 750, as more and more flows get added to the network, the desirability of a given path may keep changing. For example, compared to Table 450, where path 706 had the least weight, in Table 750, the path 706 is now the most utilized path in the network.

Figure 8A:
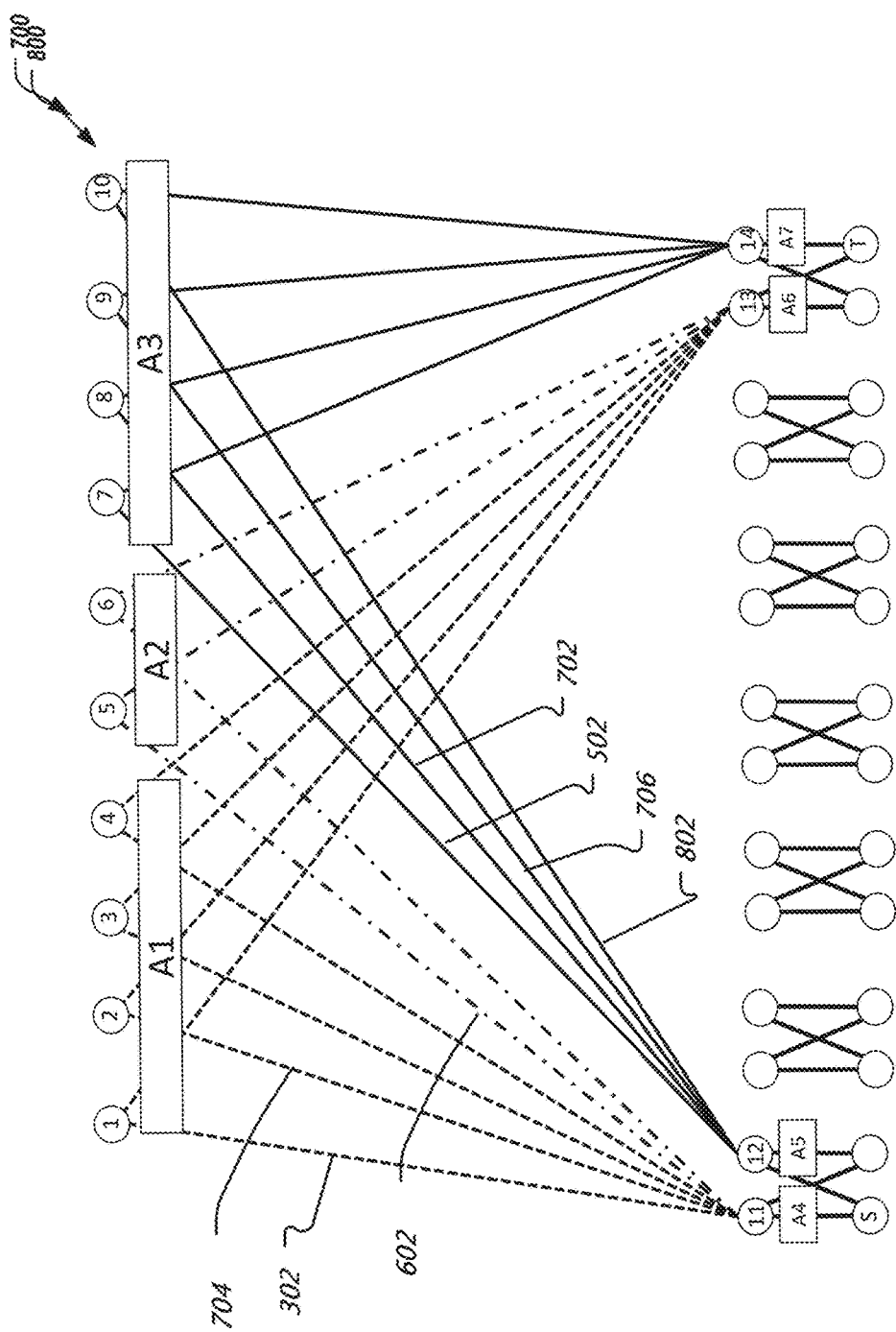
FIG. 8A is a block diagram illustrating an example path assignment to a flow in a network that includes shared risk link groups.

FIG. 8A illustrates an example state of the network 800, after many additional path assignments (e.g., path 802) have taken place during the operation of the network.

Figure 8B:
FIG. 8B is an illustration of an example state of a path weight table after flow assignment.

FIG. 8B illustrates an example state of a path weight Table 850 after multiple flow assignment. During operations, paths may get assigned or un-assigned, when flows are discontinued, thus the example utilization column in Table 850 may see values increase or decrease, as different flows are being assigned to or deleted from the network. In some cases, two different paths may also have the same utilization, as shown in FIG. 88 (e.g., two paths have 125 flows each), but in general each path may carry a different number of flows and may thus have a different percent utilization.

In some embodiments, assignment of network bandwidth to every next flow demand may be made to minimize common failure, while assigning resources using fairness and tiebreaker criteria. When flows are assigned to paths, their weights are updated so that the paths become less desirable for allocating a next incoming flow to the same path.

From the illustrative example, it can be seen that, in some embodiments, path weights can be stored in tabular format, which may be sorted for easy selection. The weights on each path are updated after assignment of flows to paths by adding a value to the weight, e.g., a +1 to the weight. The example also illustrates the simplicity of the method in that a simple weight assignment can be used to provide both fairness to the scheme and also reducing the impact of failures by discouraging path assignments to paths that belong to a greater number of shared resource groups.

In some embodiments, every next iteration remembers the assignments from the previous iterations. In a fair share situation, the assignment may be performed at random to all paths that meet a given criterion. However, after a flow is assigned to a link, the corresponding weight of the link increases. Thus, after flow allocation, that link becomes less desirable that the other links with which it was tied. The fairness procedure might be performed at a granularity that is small enough that, at any given time, all paths are within X amount of each other, as explained below.

Example Networks with Multiple Sender Node/Receiver Node Pairs

In typical deployments, data packets flow in many different directions, from multiple source nodes to multiple destination nodes. The path selection at one source node may thus affect weight of a path, and thus a subsequent path selection performed at another source node. Therefore, a centralized path selection module may sequentially assign paths to various source nodes and streamline weight updating and path selection process.

One problem that comes up when flow assignments are made for multiple sender-receiver node pairs is to maintain a fairness in the assignment. For example, when two node pairs request path selection, the path selected for the first node pair may impact latency achievable on the path selection for the next node pair.

In some embodiments, fairness may be achieved by granularizing the amount of data bandwidth that gets assigned on a per-node pair basis. A trade-off, e.g., a weighted optimization, may be performed on how small each path assignment is in terms of traffic bandwidth, and how many computations the path selection module is to perform. For example, when two flow requests are simultaneously made in a network, a 100 Mbps request for a flow from A to B and a 20 Mbps request for a flow from C to D, whether the 100 Mbps request is assigned as a single unit may impact the SRLG weights in the system and consequently the latency achieved for the 20 Mbps flow from C to D. Instead, the path assignment module may split the 100 Mbps request into 5 granular steps of 20 Mbps each, with the first 20 Mbps given to A-B flow, followed by next 20 Mbps given to the C-D flow, followed by the remaining 80 Mbps of the A-B flow.

One performance criteria used for selection of which flows are assigned paths first and at what granularity may be based on minimizing maximum failure impact of a shared risk group. For example, the performance criteria may select node pairs and granularity f such that no failure of a shared risk group will cause greater than X data rate traffic to fail for a single flow. Another performance criterion may be to select node pairs based on service layer agreements for the applications for which flows are being assigned. Yet another performance criterion may be to make each flow as granular as possible, subject to a minimum-specified granularity for a flow.

During the assignment of the resources in networks having multiple sender node-receiver node pairs, potential path candidates may be selected as pairs and ties may be resolved between the pairs in a sequential manner.

Figure 9:
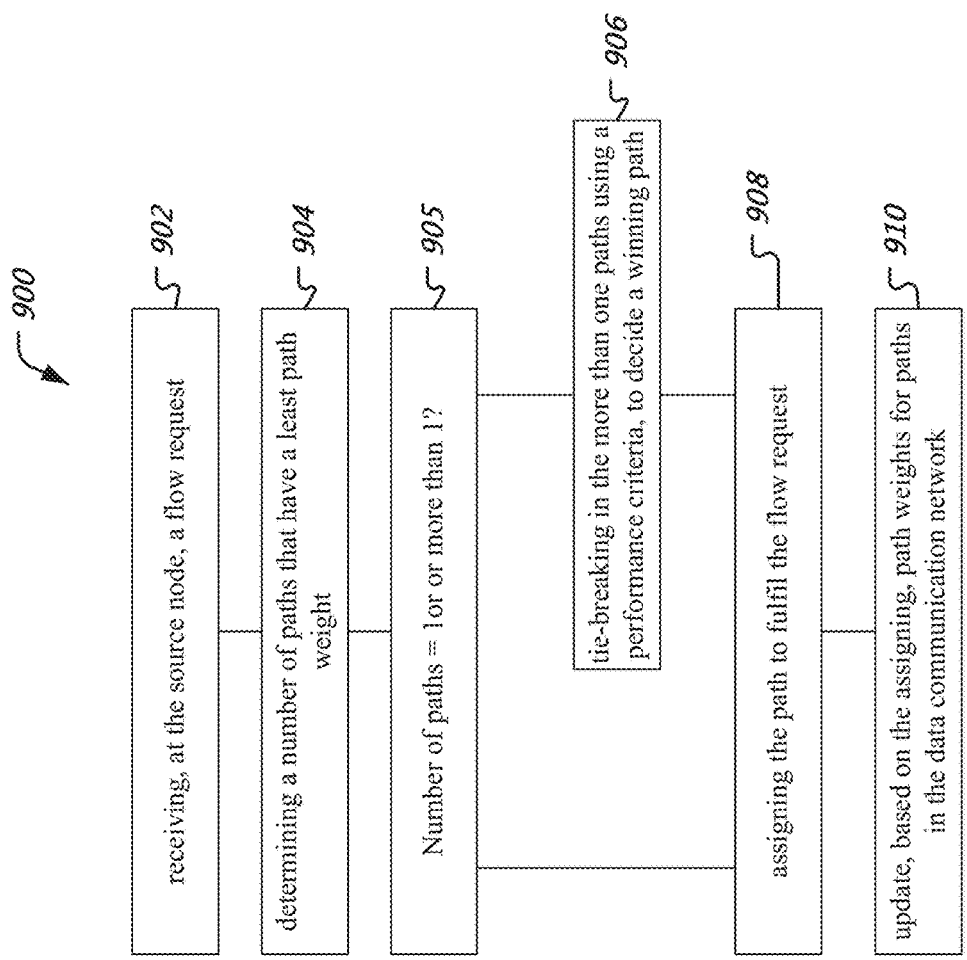
FIG. 9 is a flow chart illustrating an example method of assigning paths to flows in a communication network.

FIG. 9 illustrates an example method 900 for performing data flow allocation in a data communication network.

At 902, the method 900 includes receiving, at the source node, a flow request for transmitting data from the source node to a destination node.

At 904, the method 900 includes determining, from a plurality of paths from the source node to the destination, a number of paths that have a least path weight. As described herein, a path may represent a communication resource and a corresponding path weight for each path is a measure of communication resource sharing by the path with other paths in the data communication network. In some embodiments, the path weight for each path is calculated using a number of shared resources link groups (SRLG) to which that path belongs, wherein nodes in an SRLG share at least one communication resource in common.

At 905, the method 900 includes determining whether a single path has the minimum weight or whether there are more than one paths that have the least path weight, e.g., whether there is a tie between multiple paths based on the determination 904.

At 906, the method 900 includes, in the event that there is more than one path corresponding to the lowest path weight, then tie-breaking among the more than one paths using a performance criteria, to decide a winning path. In some embodiments, the tie-breaking includes selecting a path with a least end-to-end communication delay. In some embodiments, the tie-breaking includes selecting a path that is least utilized when measured as a percent of maximum utilization for that path. In some embodiments, the tie-breaking is performed for the more than one paths by comparing a measure of the performance criterion between two paths at a time.

At 908, the method 900 includes, assigning the winning path to fulfil the flow request. In the event that there is only a single path with the minimum path weight, that single path is assigned to the flow. The path assignment may be performed locally at the source node, or may be performed by a centralized controller in the communication network and may be communicated to the source node of data.

At 910, the method 900 includes updating, based on the assigning, path weights for paths in the data communication network. In some embodiments, the updating includes increasing by a unit, e.g., a "+1," the path weight of each path that belongs to each SRLG to which the path assigned to the flow request also belongs. For example, with reference to FIG. 3A to FIG. 8B, an example of path weight matrix where path weights are used for path allocation and are updated based on path allocation is described.

In some embodiments, the source node may maintain, for each destination node in the data communication network, a path weight table in which each row corresponds to a path between the source node and the destination node, the row having a column entry representing the path weight for that path. In some embodiments, the path weight table further includes, for each row, an entry indicating whether or not that path is currently in use for carrying data traffic. In some embodiments, the method 900 may include sorting, after the updating, rows of the path weight table according to descending order of path weight values.

In some embodiments, a data transmission apparatus for operation in a data communication network for transmitting data to a destination node includes a memory that stores instructions and a processor that reads the instructions from the memory and implements a method of allocating data flows, the method as described with respect to the method 900.

Example Computer System

Figure 10:
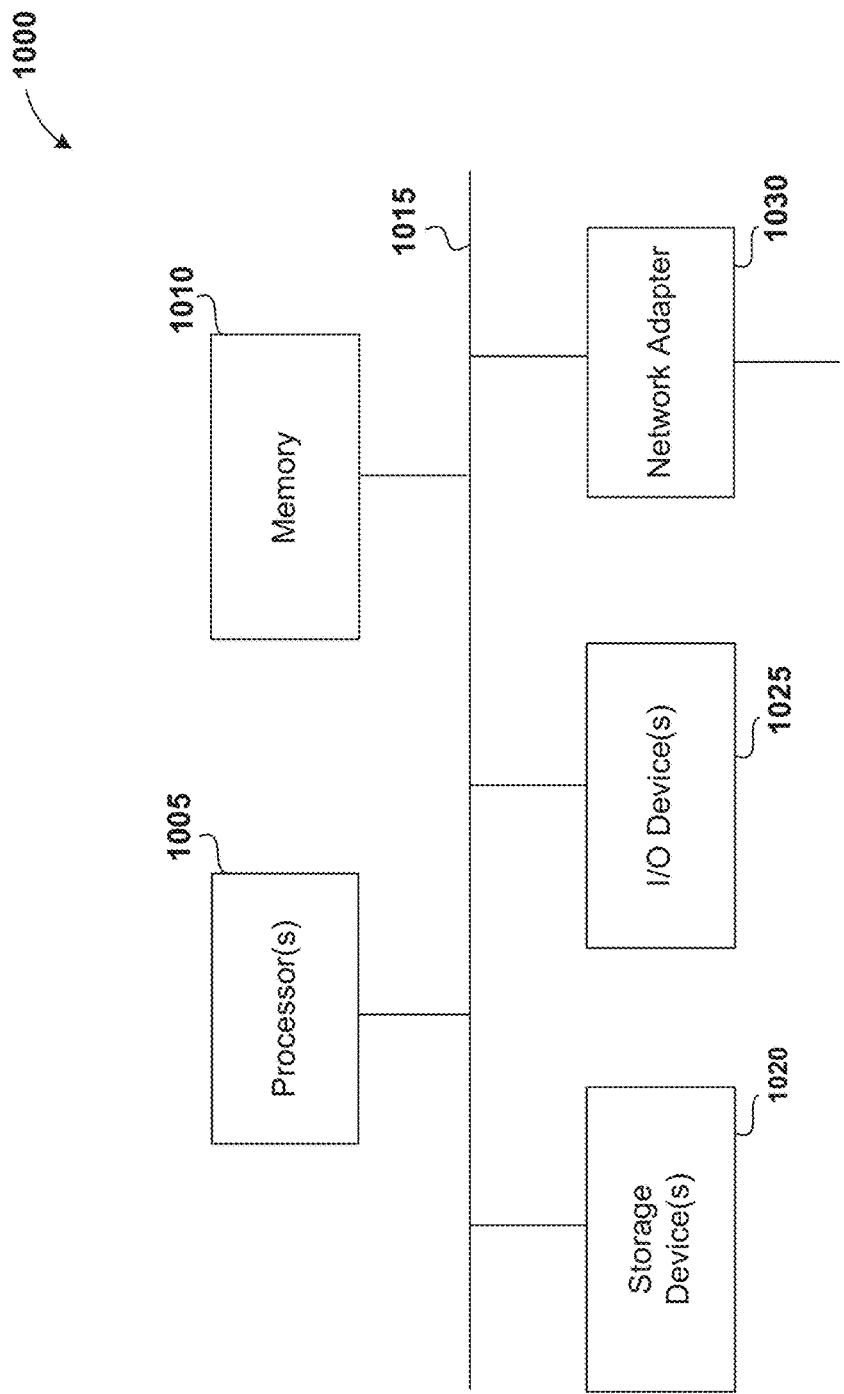
FIG. 10 is a block diagram illustrating an example of a communication node.

FIG. 10 is a block diagram of a computer system as may be used to implement features of some of the embodiments, e.g., to implement the path selection module. The computing system 1000 may include one or more central processing units ("processors") 2505, memory 1010, input/output devices 1025 (e.g., keyboard and pointing devices, display devices), storage devices 1020 (e.g., disk drives), and network adapters 1030 (e.g., network interfaces) that are connected to an interconnect 1015. The interconnect 1015 is illustrated as an abstraction that represents any one or more separate physical buses, point to point connections, or both connected by appropriate bridges, adapters, or controllers. The interconnect 1015, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The memory 1010 and storage devices 1020 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 1010 can be implemented as software and/or firmware to program the processor(s) 1005 to carry out actions described above. In some embodiments, such software or firmware may be initially provided to the processing system 1000 by downloading it from a remote system through the computing system 1000 (e.g., via network adapter 1030).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

It will be appreciated by one of skill in the art that techniques for reducing disruptions due to failure in data communication network are disclosed. In some disclosed embodiments, a record of which paths are being shared among multiple data flows is maintained. When a path is being shared among multiple flows, the path is de-emphasized for further allocation using a weight based scheme.

The disclosed and other embodiments, modules and the functional operations described in this document (e.g., an optical receiver, a distortion compensator, a step size controller, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. In a data communication network in which multiple paths exist for transmitting data from a source node to a destination node, a method of allocating data flows, comprising:
   receiving, at the source node, a flow request for transmitting data from the source node to the destination node;
   determining, from a plurality of paths from the source node to the destination node, a number of paths that have a least path weight, wherein a path comprises a communication resource, and a corresponding path weight for each path is calculated using a number of communication resources shared by the path with other paths in the data communication network;
   assigning, when only a single path corresponding to the lowest path weight exists, the single path to fulfil the flow request;
   when more than one path corresponding to the lowest path weight exist, tie-breaking in the more than one path using a performance criterion, to decide a winning path;
   assigning the winning path to fulfil the flow request; and
   updating, based on the assigning, path weights for paths in the data communication network;
   wherein the path weight for each path is calculated using a number of shared resources link groups (SRLG) to which that path belongs, wherein nodes in an SRLG share at least one communication resource in common;
   wherein the updating includes:
   increasing by a unit, the path weight of each path that belongs to each SRLG to which the path assigned to the flow request also belongs.

2. The method of claim 1, wherein the tiebreaking includes selecting a path with a least end-to-end communication delay.

3. The method of claim 1, wherein the tie-breaking includes selecting a path that is least utilized when measured as a percent of maximum utilization for that path.

4. The method of claim 1, wherein the tie-breaking is performed for the more than one paths by comparing a measure of the performance criterion between two paths at a time.

5. The method of claim 1, further comprising:
   maintaining, by the source node, for each destination node in the data communication network, a path weight table in which each row corresponds to a path between the source node and the destination node, the row having a column entry representing the path weight for that path.

6. The method of claim 5, wherein the path weight table further includes, for each row, an entry indicating whether or not that path is currently in use for carrying data traffic.

7. The method of claim 5, further including:
   sorting, after the updating, rows of the path weight table according to descending order of path weight values.

8. A data transmission apparatus for operation in a data communication network for transmitting data from a source node to a destination node, comprising:
   a memory that stores instructions;
   a processor that comprises:
      a component configured to receive, at the source node, a flow request for transmitting data from the source node to a destination node;
      a component configured to determine, from a plurality of paths from the source node to the destination node, a number of paths that have a least path weight, where a path represents a communication resource and a corresponding path weight for each path is calculated using a number of communication resources shared by the path with other paths in the data communication network;
      a component configured to assign, when only a single path corresponding to the lowest path weight exists, the single path to fulfil the flow request;
      a component configured to, when more than one path corresponding to the lowest path weight exist, tie-break in the more than one path using a performance criterion, to decide a winning path;
      a component configured to assign the winning path to fulfil the flow request; and
      a component configured to update, based on the assigning, path weights for paths in the data communication network;
      wherein the path weight for each path is calculated using a number of shared resources link groups (SRLG) to which that path belongs, wherein nodes in an SRLG share at least one communication resource in common;
      wherein the component configured to update includes:
         a component configured to increase by a unit, the path weight of each path that belongs to each SRLG to which the path assigned to the flow request also belongs.

9. The apparatus of claim 8, wherein the component configured to tie-break includes a component configured to select a path that is least utilized when measured as a percent of maximum utilization for that path.

10. The apparatus of claim 9, wherein the component configured tie-break includes a component configured to select a path with a least end-to-end communication delay.

11. The apparatus of claim 9, wherein the tie-breaking is performed for the more than one paths by comparing a measure of the performance criterion between two paths at a time.

12. The apparatus of claim 8, wherein the apparatus further comprises:
   a component configured to maintain, by the source node, for each destination node in the data communication network, a path weight table in which each row corresponds to a path between the source node and the destination node, the row having a column entry representing the path weight for that path.

13. The apparatus of claim 12, wherein the path weight table further includes, for each row, an entry indicating whether or not that path is currently in use for carrying data traffic.

14. The apparatus of claim 12, wherein the component configured to update is further configured to sort, after the updating, rows of the path weight table according to descending order of path weight values.

15. A computer program product comprising a non-transitory computer-readable medium that stores processor-executable code, the code comprising instructions for implementing a method of allocating data flows in a data communication network in which multiple paths for transmitting data from a source node to a destination node exist, the instructions comprising:

instructions for receiving, at the source node, a flow request for transmitting data from the source node to the destination node;

instructions for determining, from a plurality of paths from the source node to the destination node, a number of paths that have a least path weight, wherein a path comprises a communication resource, and a corresponding path weight for each path is calculated using a number of communication resources shared by the path with other paths in the data communication network;

instructions for assigning, when only a single path corresponding to the lowest path weight exists, the single path to fulfil the flow request;

instructions for tie-breaking, when more than one path corresponding to the lowest path weight exist, in the more than one path using a performance criterion, to decide a winning path;

instructions for assigning the winning path to fulfil the flow request; and instructions for updating, based on the assigning, path weights for paths in the data communication network;

wherein the code further includes instructions for calculating the path weight for each path using a number of shared resources link groups (SRLG) to which that path belongs, wherein nodes in an SRLG share at least one communication resource in common;

wherein the instructions for updating includes:
instructions for increasing by a unit, the path weight of each path that belongs to each SRLG to which the path assigned to the flow request also belongs.

16. The computer program product of claim 15, wherein the tie-breaking includes selecting a path with a least end-to-end communication delay.

17. The computer program product of claim 15, wherein the tie-breaking includes selecting a path that is least utilized when measured as a percent of maximum utilization for that path.

18. The computer program product of claim 15, wherein the tie-breaking is performed for the more than one paths by comparing a measure of the performance criterion between two paths at a time.

19. The computer program product of claim 15, wherein the instructions further include instructions for maintaining, by the source node, for each destination node in the data communication network, a path weight table in which each row corresponds to a path between the source node and the destination node, the row having a column entry representing the path weight for that path.

20. The computer program product of claim 19, wherein the path weight table further includes, for each row, an entry indicating whether or not that path is currently in use for carrying data traffic.

\* \* \* \* \*